United States Patent [19]

Wolfe et al.

[11] Patent Number: 4,859,497

[45] Date of Patent: Aug. 22, 1989

[54] PROCESS FOR IMPARTING STIR-IN CAPABILITIES TO A SILVER ACTIVATED ZINC SULFIDE PHOSPHOR

[75] Inventors: Robert W. Wolfe, Towanda; James E. Morse, Milan, both of Pa.

[73] Assignee: GTE Products Corporation, Stamford, Conn.

[21] Appl. No.: 185,591

[22] Filed: Apr. 25, 1988

[51] Int. Cl.$^4$ .............................................. B05D 5/06
[52] U.S. Cl. ....................................... 427/68; 427/64; 427/221; 427/229; 427/299
[58] Field of Search .................. 427/64, 68, 221, 229, 427/299

[56] References Cited

U.S. PATENT DOCUMENTS

| | | | |
|---|---|---|---|
| 4,049,845 | 9/1977 | Lozier | 427/68 |
| 4,128,674 | 12/1978 | Hedler | 427/68 |
| 4,206,250 | 6/1980 | Oba et al. | 427/68 |
| 4,287,257 | 9/1981 | Ohmatoi et al. | 427/68 |

OTHER PUBLICATIONS

"Introduction to Luminescence of Solids", H. W. Leverenz, 1950, pp. 473-475, 1965.

*Primary Examiner*—Janyce Bell
*Attorney, Agent, or Firm*—Donald R. Castle; L. Rita Quatrini

[57] ABSTRACT

A process is disclosed for pigmenting and coating a silver activated zinc sulfide phosphor and for imparting stir-in capabilities to the phosphor. The process comprises deagglomerating the phosphor, forming an aqueous slurry of phosphor particles, pigment particles, a binding agent which can be latex polymers or copolymers, the binding agent having a glass transition temperature of greater than about 20° C. and a silica-based compound to produce a silica based coating on the phosphor particles, and agitating the slurry, separating the solids from the resulting liquor, and drying the solids at a temperature above the Minimum Film Formation Temperature of the latex to produce the phosphor particles wherein the pigment particles are bonded to them and wherein the pigmented phosphor particles are coated with the silica-based coating. The process comprises also pigmenting the phosphor and imparting stir-in capabilities thereto by the process as described above without adding the coating agent to the slurry. The process comprises also coating the phosphor and imparting stir in capabilities thereto by the above process without the pigments and binding agent.

5 Claims, 20 Drawing Sheets

PROCESS FOR IMPARTING STIR-IN CAPABILITIES TO A SILVER ACTIVATED ZINC SULFIDE PHOSPHOR

This invention is related to application attorney's docket D-87-2-204 entitled "Method For Increasing The Brightness Of A Europium Activated Yttrium Oxysulfide Phosphor", which is filed concurrently herewith and assigned to the same assignee as the present application.

This invention relates to a process for imparting stir-in capabilities to a silver activated zinc sulfide phosphor. It also relates to a process for coating a silver activated zinc sulfide phosphor and imparting stir-in capabilities thereto. It relates also to a process for pigmenting a silver activated zinc sulfide phosphor with and without a coating and imparting stir-in capabilities thereto.

BACKGROUND OF THE INVENTION

Silver activated zinc sulfide is almost universally used as the blue color TV primary phosphor. The preparation of this type of phosphor is described in "Introduction to Luminescence of Solids" by H. W. Leverenz, John Wiley & Sons, Inc. 1950.

Up to this time it has been the normal practice for cathode ray tube manufacturers to physically mill the phosphors in the screening vehicle prior to their application to the face plate. This process is somewhat labor intensive since the phosphor slurry has to be pumped from the mill to a container where it is stored until application. It is desirable to have phosphors which could be slurried directly in the storage tanks without first milling the phosphors. This is what is known as stir-in capability.

SUMMARY OF THE INVENTION

In accordance with one aspect of this invention, there is provided a process for pigmenting and coating a silver activated zinc sulfide phosphor and for imparting stir-in capabilities to the phosphor. The process comprises deagglomerating the phosphor, forming an aqueous slurry of phosphor particles, pigment particles, a binding agent which can be latex polymers or copolymers, the binding agent having a glass transition temperature of greater than about 20° C., and a silica-based compound to produce a silica based coating on the phosphor particles, and agitating the slurry, separating the solids from the resulting liquor, and drying the solids at a temperature above the Minimum Film Formation Temperature of the latex to produce the phosphor particles wherein the pigment particles are bonded to them and wherein the pigmented phosphor particles are coated with the silica-based coating.

In accordance with another aspect of this invention, the process comprises pigmenting the phosphor and imparting stir-in capabilities thereto by the process as described above without adding the coating agent to the slurry.

In accordance with another aspect of the invention, the process comprises coating the phosphor and imparting stir in capabilities thereto by the above process without the pigments and binding agent.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

This invention provides a process by which stir-in captbilities are imparted to a silver activated zinc sulfide phosphor. The phosphor can be coated and can be pigmented with or without a coating.

The silver activated zinc sulfide phosphor is most typically prepared according to the method described in "Introduction To Luminescence Of Solids", by H. W. Leverenz, John Wiley & Sons, Inc. 1950.

The phosphor can be pre-washed first if desired.

The phosphor is first deagglomerated by methods such as wet milling, ball milling and vibratory milling.

In accordance with one embodiment, the phosphor can be coated if desired with a silica-based coating which is preferably silicon dioxide. This is done by forming an aqueous slurry of the coating agent, zinc hydroxide and the phosphor. The purpose of the zinc hydroxide is to effect the precipitation of the silica-based coating around the phosphor particles. The zinc hydroxide can be produced by known chemical techniques such as by adding zinc sulfate and ammonium hydroxide to the slurry to form zinc hydroxide in situ. The solids which are essentially the coated phosphor are then removed from the slurry. The result of this step is a coated stir-in phosphor. The result of this step is a coated stir-in phosphor.

The resulting treated phosphor is then dried and screened, if necessary. The drying temperatures are usually from about 120° C. to about 250° C. By "stir-in" capabilities is meant that the phosphor can be used directly in the application without additional milling. This is a real advantage as far as cost and time savings in processing.

In accordance with another embodiment, a pigment is applied to the phosphor.

Many methods of binding pigment particles to phosphor particles are described in the literature. These materials are primarily used in cathode ray tubes where the pigment acts as a filter to improve the color purity and contrast of the emitted light. Both organic and inorganic pigment binders are used in the industry. U.S. Pat. No. 4,473,634 describes an inorganic binder system which uses water glass (potassium silicate) as the binder. Organic binder systems such as gelatin, described in U.S. Pat. No. 3,275,466 and various organic polymers, applied as latices, as described in U.S. Pat. No. 4,049,845, have also proved useful to the industry. However, the method as taught in U.S. Pat. No. 4,049,845 utilizes latex polymers that show a glass transition temperature, Tg, well below room temperature. These polymers are therefore rather soft and sticky and result in pigmented phosphor powders which are not free flowing and which aggregate easily. As a result, these powders are rather difficult to screen through a dry sieve, which is the normal method used to ensure that the pigmented phosphor powder is deagglomerated. The sieving step is usually the final step in the manufacture of the product. Also, there is a tendency for the pigmented phosphor powder to re-aggregate after screening due to the stickiness or "tackiness"

of the polymer binder. U.S. Pat. No. 4,049,845 discusses this problem and methods to reduce tackiness are discussed, including further processing steps such as application of inorganic and organic cross-linking agents. Such steps add to the complexity of the process and may not be effective. Phosphors prepared according to U.S. Pat. No. 4,049,845 undergo so much reagglomeration that it is necessary to wet ball mill these materials in the application slurry prior to their application to the cathode ray tube faceplate. If such a deagglomeration step were not used, the phosphor coating would be grainy and unacceptable. It is desirable to eliminate the wet ball milling step prior to the application of the phosphor to reduce handling which may degrade the phosphor and to reduce expense.

In order to produce a pigmented phosphor with stir in capabilities, the phosphor after the above described deagglomeration is processed as follows.

It has been discovered that organic polymer latices of varying compositions but with glass transition temperatures above room temperature can be used to adhere pigment particles to phosphor particles. Such latex polymers can be easily and inexpensively applied, do not require additional processing to reduce tackiness of the binder, and are suitable for manufacturing pigmented "no-mill" or "stir-in" phosphors.

A pigment which is especially suited to this invention and this phosphor is cobalt aluminate. Typically, the pigment makes up from about 1% to about 2% by weight of the phosphor and the binder makes up from about 0.05% to about 0.5% by weight of the phosphor.

It is preferable that the average phosphor particle size be in the range of from about 4 to about 15 micrometers in diameter, and that the average particle size of the pigment particles be from about 0.1 to about 1.0 micrometers in diameter.

The binding agent is a latex polymer or copolymer. A latex is herein defined as an aqueous colloidal suspension of an organic polymer or copolymer. It is critical that the binding agent have a glass transition temperature of greater than about 20° C. for the reasons given previously. By glass transition temperature is meant a temperature at which amorphous polymeric materials undergo a marked change in properties associated with a cessation of molecular motion on a local scale. Below the glass transition temperature, polymeric materials behave as hard, brittle and stiff solids. Above Tg, amorphous polymer materials behave as viscous, plastic solids. Some examples of these types of binders (1) an acrylic polymer manufactured by B. F. Goodrich under the name of Hycar 2600X256 which has a Tg of $+45°$ C., (2) a polystyrene latex manufactured by Reichold under the name of Tylac 68-157 which has a Tg of $+100°$ C., and (3) a carboxylated acrylate acrylonitrile copolymer manufactured by Reichold under the name of Synthemul DL-0685 which has a Tg of $+20°$ C.

An aqueous slurry is first formed of the phosphor particles to be pigmented, the pigment particles, and the binding agent. This is done preferably by forming an aqueous slurry of the phosphor and pigment. The usual practice is to form a slurry of the phosphor and to deagglomerate the pigment and form another aqueous slurry of the pigment and combine these two slurries into one. The binding agent which is a latex is then added. The colloidal particles have a particle size typically of from about 0.05 to about 2.0 micrometers in diameter. The resulting phosphor-pigment-binder slurry is agitated so that colloidal polymer of copolymer particles bind the pigment particles to the phosphor particles. This is usually done at room temperature. The amount of binder is typically equal to from about 0.10% to about 0.35% by weight of the phosphor.

After a period of agitation of typically but not necessarily about one-half hour, the resulting solids which are the phosphor with the pigment bonded to it by the binding agent are separated from the resulting liquor by standard techniques. This is done usually by allowing the solids to settle out and thereafter decanting off the liquor.

In accordance with still another embodiment, to the above described slurry is added a coating agent which is a silica-based compound. Zinc hydroxide is added to the slurry as described previously. This results in formation of a silica-based coating on the pigmented phosphor.

It is preferable to wash the solids with deionized water one or more times to remove the water soluble impurities such as dispersing agents which are added by the manufacturer to stabilize the latex.

The solids are then dried at a temperature above the MFT of the latex for about 8 hours. The MFT or Minimum Film Formation Temperature is the minimum temperature at which a latex will dry out to form a continuous, nonporous film. Drying is done usually at a temperature of at least about 110° C. Most typically, the drying temperature is from about 130° C. to about 160° C.

After the resulting dried phosphor is cooled, it is deagglomerated to break up the loosely bound agglomerates caused by the binder. This is done preferably by using a v-blender equipped with an intensifier bar.

The resulting deagglomerated phosphor can be screened to remove out of size material, and it is then ready for use in the application.

To more fully illustrate this invention, the following non-limiting examples are presented.

EXAMPLE 1

About 6.8 kilograms of Zns: Ag phosphor are washed and sieved through a 200 mesh screen and then added to about 6 liters of deionized water at about 20° C. and agitated to form a slurry. The slurry is added to an 18" diameter vibratory mill filled with ½" procelain balls as milling media and milled for about 10 minutes. The resulting milled slurry is then discharged to a 50 gallon stainless steel tank and the slurry formation procedure is continued for another 6.8 kg charge of powder. The volume of the slurry in the tank is then adjusted to about 25 gallons with cold deionized water. The pigment is prepared by adding 214 grams of cobalt aluminate to about 2 liters of cold deionized water and dispersing with a polytron mill for about 20 minutes. The phosphor slurry is agitated at high speed and the dispersed pigment is slowly added. The latex binder is prepared by adding about 16 grams of Synthemul DL0685 to about 12 liters of cold deionized water and stirring for about 10 minutes. The phosphor slurry is agitated at high speed and the latex is added slowly. The agitator speed is slowed down and agitation is continued for 15 minutes. The agitation is stopped and the pigmented phosphor is allowed to settle until the supernatant liquor becomes clear. The supernatant liquor is then decanted and hot deionized water is added immediately to fill the tank volume and the resulting slurry is agitated for about 15 minutes. The temperature increase helps to coagulate the latex and facilitates settling of the suspension and bind the pigment to the phosphor particles. Two or more hot deionized water washes are applied to the pigmented phosphor slurry. The phosphor is then filtered off and dried at about 140° C. for about 10 hours. The dried phosphor cake is then broken up and charged to an eight quart twin shell dry blender equipped with an intensifier bar and filled to the top of the pin intensifier bar. The phosphor is blended for about 60 minutes. This treatment breaks down any loosely held agglomerates that were formed during the pigmentation process and facilitates the final sieving step. The phosphor is then screened through a 400 mesh screen (ASTM). The resulting screened phosphor is now ready to be used in the application such as by a cathode ray tube manufacturer in their slurry coat process with no milling of the phosphor being necessary. Table 1 shows the particle size changes that occur at the various process steps.

TABLE 1

|  | 50% COULTER COUNTER | |
| --- | --- | --- |
|  | 30 sec. Sonic bath μm | 5 min. Sonic bath μm |
| Unpigmented phosphor before milling | 9.2 | 6.8 |
| Unpigmented phosphor after milling | 7.8 | 6.6 |
| Phosphor after pigmentation | 8.0 | 6.5 |
| Finished pigmented "stir-in" phosphor | 7.8 | 6.5 |

The Table shows that the finished stir-in phosphor is more deagglomerated than the unpigmented phosphor before milling. This is shown by the smaller difference between the 30 second dispersion size (mild dispersion technique) and the 5 minute dispersion size (vigorous dispersion technique) and is a relative measure of agglomeration. The unpigmented phosphor before milling would require milling before use. The finished phosphor does not require milling and is called a stir-in phosphor.

EXAMPLE 2

The procedure described in Example 1 is followed for vibratory milling about 13.6 kg of phosphor. The resulting phosphor is charged to a 50 gallon stainless steel tank. The volume in the tank is adjusted to about 20 gallons with hot deionized water. The pH of the slurry is adjusted to about 5.0 with sulfuric acid. To the resulting slurry is added about 57 ml of a colloidal silica-based dispersion with the brand name of Wesol-p and agitated for about 15 minutes. About 76 g of $ZnSO_4$ is dissolved in about 1 liter of hot deionized water and added to the phosphor slurry. The pH of the slurry is adjusted to about 9.0 with $NH_4OH$ and agitated for about 15 minutes. The phosphor is allowed to settle and the supernatant liquor is decanted off. Two hot deionized water washes are applied to bring the conductivity of the slurry to about 30 μmhos. The phosphor is filtered off and dried at about 140° C. for about 10 hours. The dried phosphor is sieved through a 400 mesh screen (ASTM). The finished product is a "stir-in" phosphor and is suitable to be used in a slurry coat process.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for pigmenting a silver activated zinc sulfide phosphor and imparting stir-in capabilities thereto, said process comprising:
   (a) deagglomerating said phosphor;
   (b) forming an aqueous slurry of the phosphor particles, pigment particles, and a binding agent selected from the group consisting of latex polymers and latex copolymers, said binding agent having a glass transition temperature of greater than about 20° C., and agitating said slurry;
   (c) separating the solids from the resulting liquor;
   (d) drying said solids at a temperature above the Minimum Film Formation Temperature of said latex to produce the phosphor particles wherein said pigment particles are bonded to said phosphor particles; and
   (e) blending the resulting pigmented phosphor to insure uniformity in said phosphor.

2. A process for pigmenting and coating a silver activated zinc sulfide phosphor and imparting stir-in capabilities thereto, said process comprising:
   (a) deagglomerating said phosphor;
   (b) forming an aqueous slurry of the phosphor particles, pigment particles, a binding agent selected from the group consisting of latex polymers and latex copolymers, said binding agent having a glass transition temperature of greater than about 20° C., a silica-based coating agent and zinc hydroxide to produce a silica-based coating on the phosphor particles, and agitating said slurry;
   (c) separating the solids from the resulting liquor;
   (d) drying said solids at a temperature above the Minimum Film Formation Temperature of said latex to produce the phosphor particles wherein said pigment particles are bonded to said phosphor particles; and
   (e) blending the resulting pigmented coated phosphor to insure uniformity in said phosphor.

3. A process of claim 2 wherein said silica-based compound is silicon dioxide.

4. A process for coating a silver activated zinc sulfide phosphor and imparting stir-in capabilities thereto, said process comprising:
   (a) deagglomerating said phosphor;
   (b) forming an aqueous slurry of phosphor particles, and a silica-based compound as a coating agent and zinc hydroxide to produce a silica-based coating on said phosphor;
   (c) separating the resulting coated phosphor particles from the resulting liquor;
   (d) drying said coated phosphor; and
   (e) blending said coated phosphor to insure uniformity in said phosphor.

5. A process of claim 4 wherein said silica-based compound is silicon dioxide.

* * * * *